United States Patent [19]

Jonsson

[11] Patent Number: 5,317,830
[45] Date of Patent: Jun. 7, 1994

[54] APPARATUS FOR HANDLING HOOKS AS USED IN LONG LINE FISHING

[76] Inventor: Sigurbjoern A. Jonsson, Kvistaland 14, Reykjavik, 108, Iceland

[21] Appl. No.: 918,048

[22] Filed: Jul. 24, 1992

[51] Int. Cl.⁵ ............................................. A01K 91/00
[52] U.S. Cl. ...................................... 43/27.4; 43/57.3; 242/106
[58] Field of Search ..................... 43/27.4, 4, 4.5, 6, 43/57.3; 242/86.5 R, 106, 96

[56] References Cited

U.S. PATENT DOCUMENTS

| | | | |
|---|---|---|---|
| 1,768,981 | 7/1930 | Henrikson | 43/57.3 |
| 2,629,197 | 2/1953 | Duvall | 43/57.3 |
| 3,022,601 | 2/1962 | Martin | 43/57.3 |
| 3,085,767 | 4/1963 | Zerbest | 43/27.4 |
| 3,660,924 | 5/1972 | McGee, Jr. | 43/57.3 |
| 3,806,056 | 4/1974 | La Tour | 242/55 |
| 4,453,330 | 6/1984 | Jorgensen-Dahl | 43/6.5 |
| 4,774,782 | 10/1988 | Jacobsson et al. | 43/4.5 |
| 4,908,972 | 3/1990 | Stamer et al. | 43/4 |
| 5,063,702 | 11/1991 | Williams | 43/27.4 |

*Primary Examiner*—Richard K. Seidel
*Assistant Examiner*—Chuck Y. Mah
*Attorney, Agent, or Firm*—Richard C. Litman

[57] ABSTRACT

A long line fishing hook apparatus includes a reel having a core bounded by side walls. To accommodate hooks attached to a mainline by snoods, at least one side of the reel is provided with a plurality of spiral or arcuate slots as defined between adjacent curve or track members. A the mainline is wound about the reel core by an auxiliary wheel, the hooks are successively directed transversely into the access of respective ones of the slots and urged toward the core of the apparatus. The arcuate disposition of the slots allows for the reception of a substantial number of hooks over those numbers which could otherwise be accommodated. With the slots describing an arc of substantially 180 degrees or more, an Archimedean spiral arrangement exists.

2 Claims, 3 Drawing Sheets

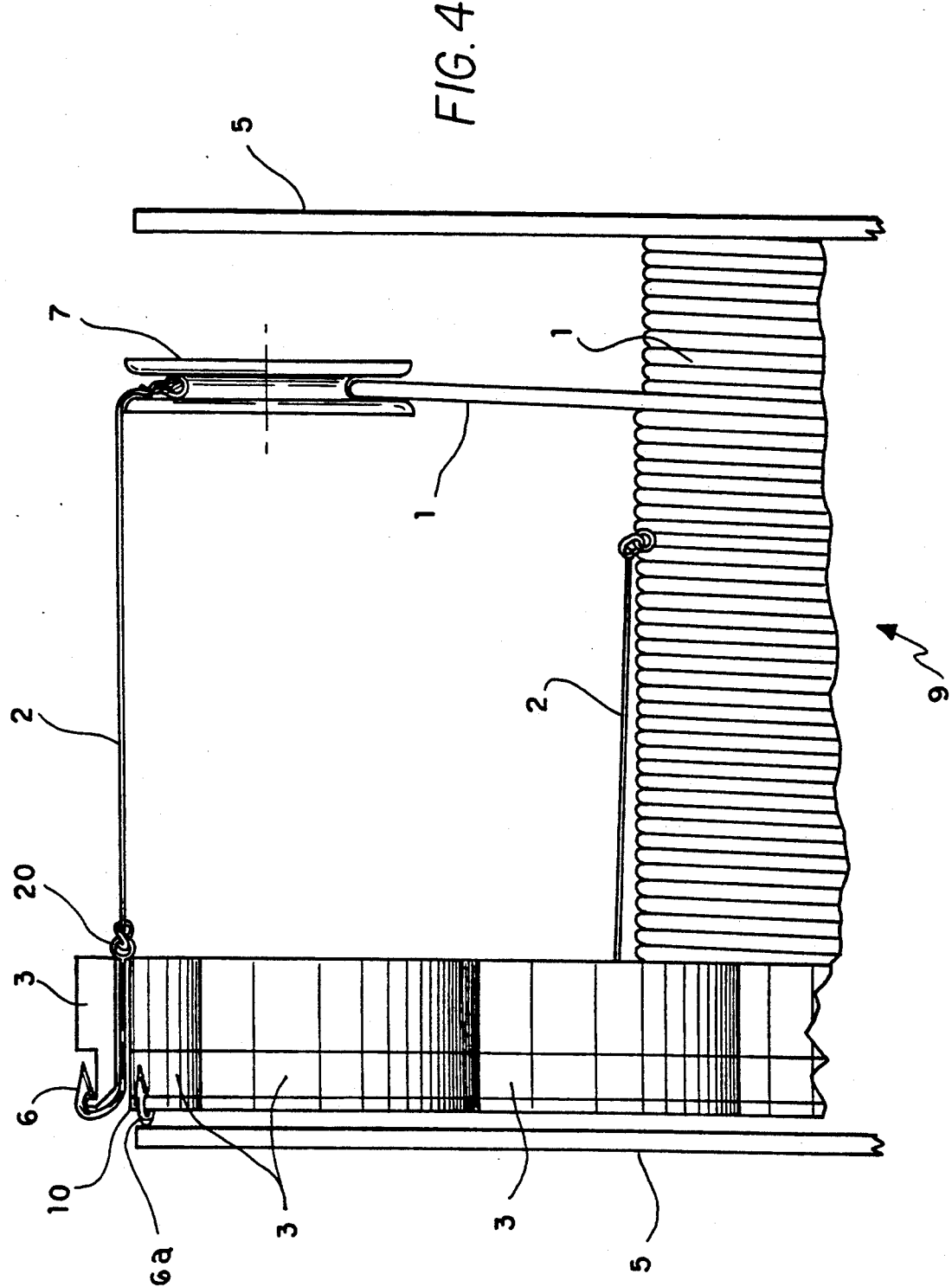

APPARATUS FOR HANDLING HOOKS AS USED IN LONG LINE FISHING

BACKGROUND OF THE INVENTION

This invention concerns a reel/spool which is used to mechanically wind a mainline on and off between the inner side/sides of the reel/spool. There are provided curves/tracks for long-line hooks. The curves/tracks define slots therebetween which are arched in accordance with an Archimedean spiral such that a vastly increased hook capacity is achieved in view of the greater total linear extent defined by the arcuate slots.

The invention concerns a reel/spool which is used to wind a fishing line on and off while curves/tracks forming arcuate slots serve to receive hooks for use in long-line fishing. The curves/tracks are formed on the inner side of the reel/spool with certain intervals in between in order for the hooks to be steered/guided into their right place. The curves/tracks can both be on one of the inner sides or both inner sides of the reel/spool. Hooks enter curves/tracks mechanically on a steering bar when the line is hauled so that each hook enters a curve/track and by the rotation of the spool/reel, the hook moves towards the core of the spool/reel. By opposite rotation of the spool/reel a hook leaves or is removed from the curves when a line is set. The curves/tracks are arched in accordance with Archimedean law. The hook can be steered into the curves/tracks in two ways. By using the hook-bend as steering and by use of protuberance/knob steering. By using this curve/track system, the tendency of a hook to become tangled in the mainline is avoided, whether using rope line or monofilament line.

By separating the hooks from the mainline and putting them into slots as defined by the curves/tracks, tangles are avoided. There is a method known since 1988 (according to East German patent no. 0524321), to wind a mainline on a spool/reel and separate the hooks from the mainline by storing them on gripping arms on the reel. In that way a very limited amount of hooks can be stored on the reel. It is therefore necessary to use many such reels on board fishing boats or, the reels have to be very big, (but then they are difficult to manage), in order to lay a line with the most suitable amount of hooks. By using arched curves/tracks based on the Archimedean law, it is possible to store a much greater number of hooks on the reel/spool than on the above mentioned gripping arms. The Archimedean system gives very long tracks/curves for hooks on the inner side of the spool and it is possible to have curves/tracks on both of the inner sides or flanges of the reel/spool. With a straight line defining the shortest distance between two points, it follows that by arching the tracks and slots, the linear extent between the access to each slot and the terminus of each slot at the core of the reel, will be significantly greater and therefore, many more hooks may be stored within each slot of the instant apparatus. Now, since monofilament line is becoming more and more widespread, it is even more important to find a way to store as many hooks as possible in a space as compact as possible. It is precisely this that the present invention is focused on, that is, to store as many hooks as possible in a space as compact as possible and it is also possible to use the invention for conventional mainline.

The invention is now explained with reference to the attached drawings.

BRIEF DESCRIPTION OF THE DRAWINGS

FIG. 4 is a view similar to FIG. 3, as modified to accommodate hook snoods without guidance protuberances/knobs.

Similar reference characters designate corresponding parts throughout the several figures of the drawings.

DESCRIPTION OF THE PREFERRED EMBODIMENTS

Figure 2:
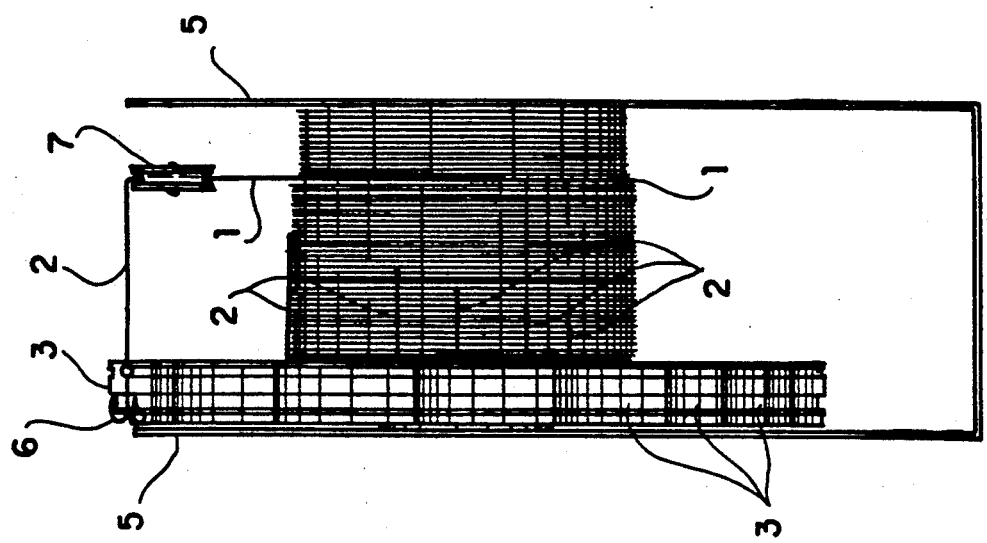
FIG. 2 is a front elevation of the reel/spool assembly.
Figure 1:
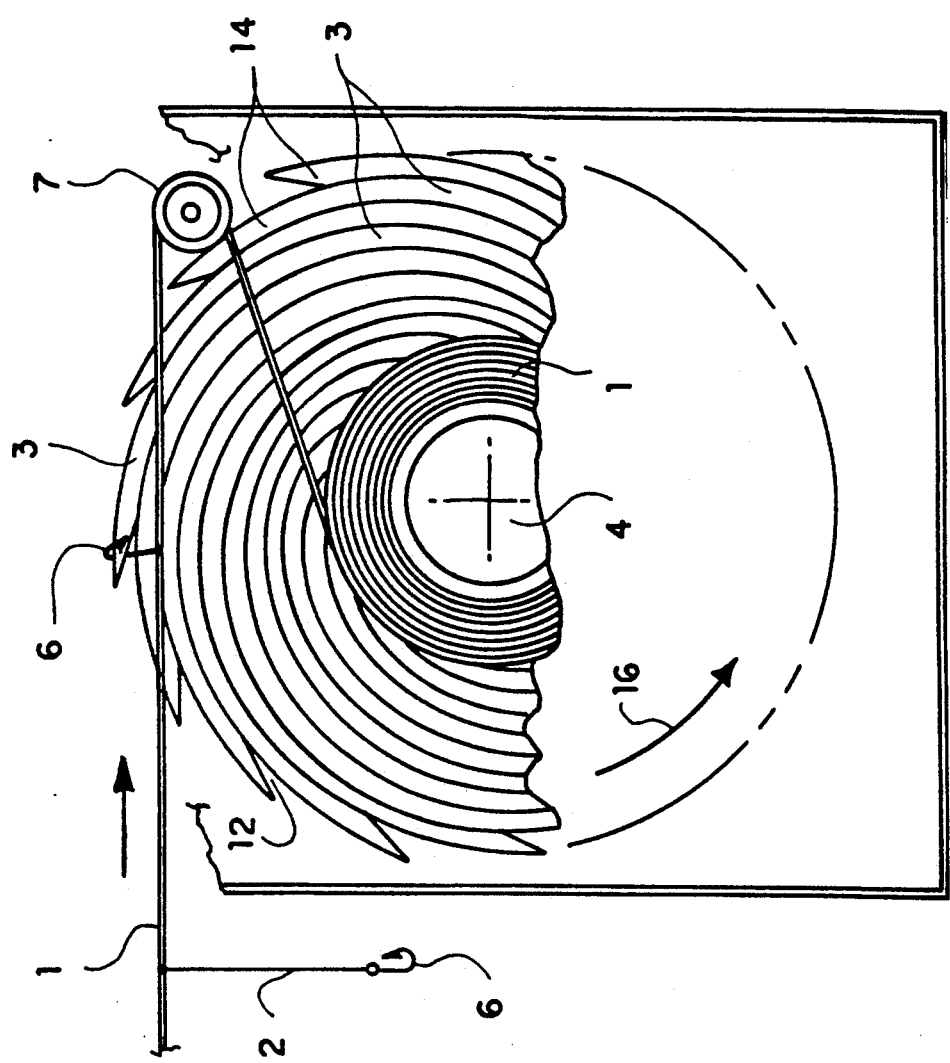
FIG. 1 is a side elevation of the reel/spool, with one side flange removed for clarity.

In FIG. 1, the reel/spool is seen from the side, wherein one side has been removed and shows mainline 1, snood 2 and hook 6 that enters the access 12 of an arcuate slot 14 as defined by two adjacent curves/tracks 3,3 formed adjacent a sidewall or flange 5. The reel/spool 9 will be seen to include a hub or core 4 that mainline 1 winds on after passing over an auxiliary wheel 7 that assists in the arrangement or guidance of the mainline about the core 4 as depicted in FIG. 2. The guiding thrust of the present invention is most clearly apparent from this view wherein the arcuate nature of the tracks and slots is quite evident. The total number of hooks which may occupy all of the slots 7 is vastly superior when compared with any other reel wherein the tracks and slots are straight, whether extending from the core radially or angularly. With the spiral arrangement defined by the present arcuate slots 14, it will be seen that any one slot 14, from its access 12 to its innermost terminus at the core 4, will describe an arc of well over 180 degrees and a linear extent several times greater than the radial extent of the slots.

In FIG. 2, the reel/spool is seen from the front and shows curves/tracks 3 that are fastened on the left-most inner side 5 of the reel/spool 9 with several of the slot accesses 12 being viewable in this position. Also shown is the stored mainline 1 and a plurality of, stored snoods 2 with their respective hooks 6 in successive ones of the arcuate slots 14. With the mainline 1 reversing its direction as it passes over the auxiliary wheel 7 and the reel 6 continuing its rotation in a direction counter to the initial incoming direction of the mainline 1, it will be seen from FIGS. 1 and 2 that as the mainline 1 is guided by the wheel 7, the hooks 6 successively directed into the slot accesses 12 will be subsequently drawn inwardly through the slots 14 and toward the reel core 4.

Figure 3:
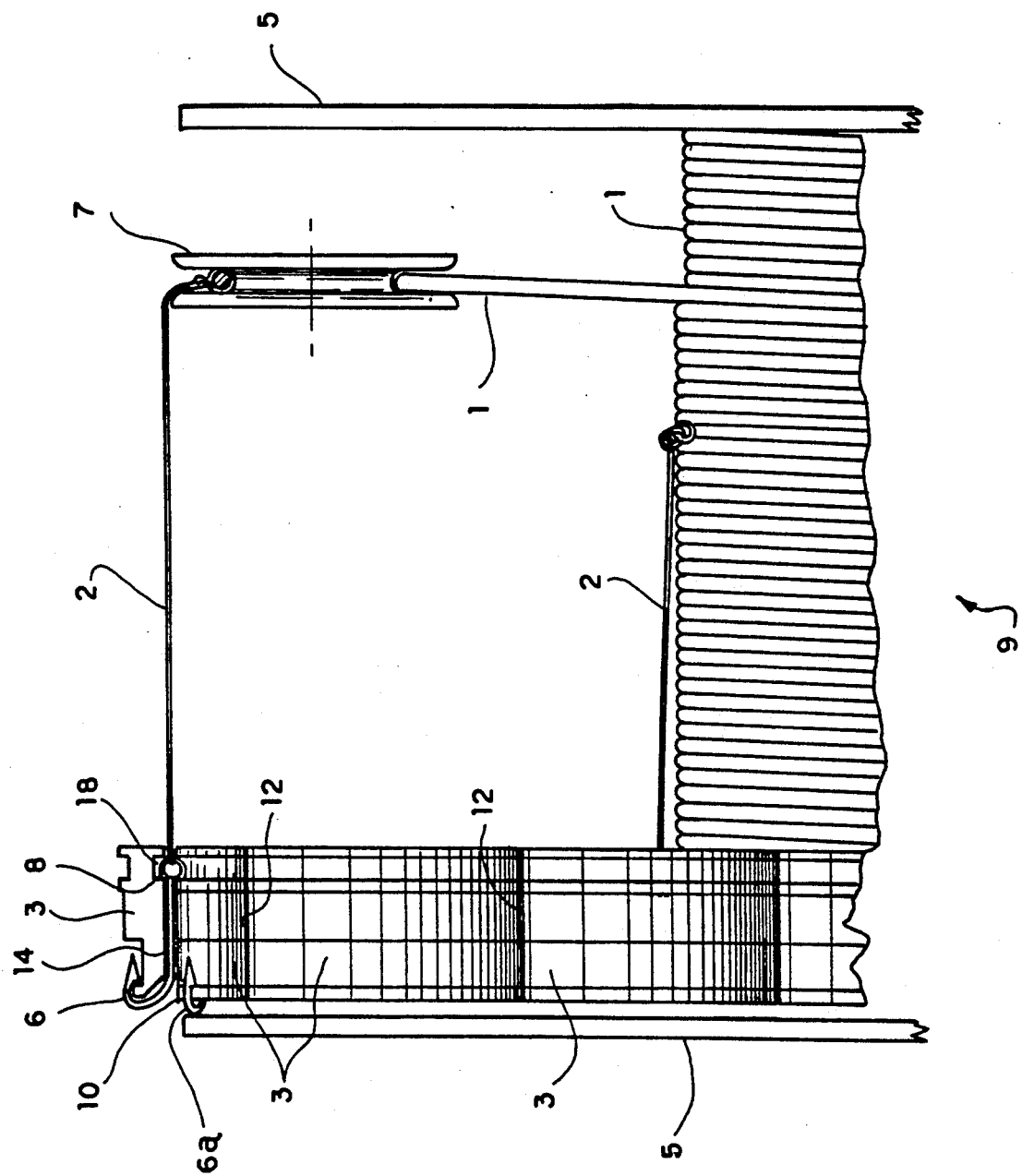
FIG. 3 is a fragmentary enlarged front elevation of the assembly of FIG. 2.

The enlarged view of FIG. 3 most clearly shows the introduction of a hook 6 into a slot 14 while a previously introduced hook 6a is shown projecting from the slot (not shown) as provided between two other adjacent curves or tracks 3. As the reel 9 is rotated in the direction 16 of FIG. 1, the hooks 6 entrapped within the various arcuate slots 15 will be constantly drawn inwardly toward the core 4 of the assembly. To assist in this movement, there may be provided positive steering means, such as the illustrated knob or protuberance 8 and which is adapted to travel within its own recess 18 in the curves or tracks 3. Also seen in this figure is the mainline 1, the auxiliary wheel 7 with a snood 2 leading to the hook being fed into the slot 14 and a fastening member 10 on the curved tracks 3. Depicted are the respective snoods 2, mainline 1 that is being wound up on reel/spool 9, the two sides 5 on the reel/spool 9, fastening 10 on curve/track 3 on one side 5 of the reel/spool 9 and auxiliary wheel 7.

The remaining FIG. 4 is similar to FIG. 3 but depicts an alternative arrangement devoid of the recess 18. Instead, each hook 6 is formed with a more conventional eye 20 and which, combined with the bent hook end of the hook 6, sandwiches the curve/track elements 3.

I claim:

1. Apparatus for handling hooks and snoods as used in long line fishing comprising:

a reel having a core and opposite sides, at least one side including a plurality of curved track members forming arcuate transversely extending slots therebetween, said slots having an outermost access and terminating adjacent said core, said slots describing an arc of at least 180 degrees between each said slot access and said reel core, and guide means to receive a mainline and direct said mainline about said reel core while hooks on snoods are received within said slots and stored parallel to said core.

2. Apparatus for handling hooks and snoods as used in long line fishing according to claim 1 wherein;

said track members include a recess to accommodate enlarged knobs as contained on said hooks.

* * * * *